US012585127B2

(12) United States Patent
Yan et al.

(10) Patent No.: US 12,585,127 B2
(45) Date of Patent: Mar. 24, 2026

(54) INTERPUPILLARY DISTANCE ADJUSTING DEVICE

(71) Applicant: AAC Microtech (Changzhou) Co., Ltd., Changzhou (CN)

(72) Inventors: Feng Yan, Changzhou (CN); Jinguo Wu, Changzhou (CN); Xiaofeng Pu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 326 days.

(21) Appl. No.: 18/398,218

(22) Filed: Dec. 28, 2023

(65) Prior Publication Data

US 2024/0411143 A1     Dec. 12, 2024

Related U.S. Application Data

(63) Continuation of application No. PCT/CN2023/098945, filed on Jun. 7, 2023.

(51) Int. Cl.
*G02B 27/01* (2006.01)
(52) U.S. Cl.
CPC .. *G02B 27/0176* (2013.01); *G02B 2027/0154* (2013.01); *G02B 2027/0178* (2013.01)

(58) Field of Classification Search
None
See application file for complete search history.

(56) References Cited

FOREIGN PATENT DOCUMENTS

CN          205958849 U   *   2/2017

* cited by examiner

*Primary Examiner* — Bao-Luan Q Le
*Assistant Examiner* — Danell L Owens
(74) *Attorney, Agent, or Firm* — Wiersch Law Group

(57)          ABSTRACT

An interpupillary distance adjusting device applied to VR glasses, the VR glasses include bracket body, first and second lens modules, the device includes driving module fixed to the bracket body and located between the first and second lens modules. The driving module is configured to drive the first and second lens modules to move towards or away from each other to realize interpupillary distance adjustment. The driving module includes frame, driving unit, first and second gear members, first and second racks parallel to each other. An end of the first rack is fixed to the first lens module, an end of the second rack is fixed to the second lens module. Compared with the related art, the interpupillary distance adjusting device can automatically and synchronously adjust the interpupillary distance, with high adjustment accuracy, small volume occupation, high driving efficiency, high stability, and good user experience.

10 Claims, 11 Drawing Sheets

100

A–A

B-B

C–C

INTERPUPILLARY DISTANCE ADJUSTING DEVICE

TECHNICAL FIELD

The present disclosure relates to the field of virtual reality and, in particular to, an interpupillary distance adjusting device applied to VR glasses.

BACKGROUND

Virtual reality (VR) head-mounted display device is a product that integrates simulation technology and computer graphics, human-machine interface technology, multimedia technology, sensing technology, network technology, and other technologies, which is a new means of human-machine interaction created with the help of computers and the latest sensor technology. VR glasses not only allow every enthusiast to experience with surprise and joy, but also deeply attracted by its origin and future.

The VR glasses in the related art include a glasses bracket body, a left lens module and a right lens module arranged on the bracket body, threads for adjusting the interpupillary distance of the left lens module and right lens module, and a head mounted structure fixed to the bracket body. The head mounted structure is placed on the user's head, so that the left and right eyes correspond to the left lens module and right lens module, respectively. The interpupillary distance between the left lens module and right lens module is adjusted by rotating a knob, thereby improving the VR experience.

However, the VR glasses in the related art adjust the interpupillary distance through threads. During operation, two motors are used to drive the mechanism to move the lenses, resulting in low adjustment accuracy. The synchronization and stability of the left lens module and right lens module are unsatisfied, and thus the user experience is poor. Using a long screw to drive with left-hand and right-hand threads is limited by the structure with big volume occupation and high efficiency loss.

Therefore, it is necessary to provide a new interpupillary distance adjusting device to solve the above problems.

SUMMARY

The technical problem to be solved by the present disclosure is to provide an interpupillary distance adjusting device which can automatically synchronize and adjust the interpupillary distance, with high adjustment accuracy, small volume occupation, high stability, and thus good user experience.

In order to solve the above technical problem, the present disclosure provides an interpupillary distance adjusting device which is applied to VR glasses. The VR glasses include a bracket body, a first mounting hole and a second mounting hole that penetrate through the bracket body and spaced apart from each other, a first lens module mounted in the first mounting hole, and a second lens module mounted in the second mounting hole. A transverse aperture of the first mounting hole is greater than a diameter of the first lens module, and a transverse aperture of the second mounting hole is greater than a diameter of the second lens module. The interpupillary distance adjusting device includes a driving module fixed to the bracket body and located between the first lens module and the second lens module, and the driving module is configured to drive the first lens module and the second lens module to move synchronously in a direction towards each other or in a direction away from each other to realize interpupillary distance adjustment. The a frame fixed to the bracket body, a driving unit fixed to one side of the frame, a first gear member rotatably disposed in the frame and in transmission connection with the driving unit, a second gear member rotatably disposed in the frame and engaged with the first gear member, a first rack engaged with the first gear member, and a second rack engaged with the second gear member. An end of the first rack close to the first lens module is fixed to one side of the first lens module, and an end of the second rack close to the second lens module is fixed to one side of the second lens module. The first rack and the second rack are parallel to each other. The first gear member includes a first pin bearing fixedly connected to an output end of the driving unit and a first gear fixed to the first pin bearing. The second gear member includes a second pin bearing rotatably arranged in the frame and a second gear fixed to the second pin bearing. The first gear has a tooth number less than the second gear.

As an improvement, the first rack and the second rack are arranged in a staggered manner, and the first rack and the second rack move the same amount per unit time.

As an improvement, the frame includes a frame body fixed to one side of the bracket body, an extension portion formed by extending from one side of the frame body close to the first lens module, a through hole penetrating through the extension portion, a groove formed by recessing from one side of the frame body close to the bracket body in a direction away from the bracket body, and a first limiting slot and a second limiting slot respectively penetrating through the frame body and communicating with the groove. The driving unit is fixed in the through hole, the first gear member and the second gear member are located in the groove, the first rack is disposed in the first limiting slot and the second rack is disposed in the second limiting slot.

As an improvement, the first rack includes a first rack body, a first support plate extending from the first rack body in a direction close to the bracket body, and a first tooth-shaped structure extending from the first support plate in a direction close to the bracket body; one side of the first rack body away from the bracket body is spaced apart from a slot wall of the first limiting slot to form a first gap, and one side of the first support plate away from the bracket body is spaced apart from a slot wall of the first limiting slot to form a second gap.

As an improvement, the second gap is smaller than the first gap.

As an improvement, the interpupillary distance adjusting device further includes a multi-stage planetary gearbox, an input end of the multi-stage planetary gearbox is fixedly connected to the driving unit, and an output end of the multi-stage planetary gearbox is fixedly connected to the first gear member. An inner ring gear structure is arranged in the through hole, the multi-stage planetary gearbox is arranged in the through hole, and the multi-stage planetary gearbox and the inner ring gear structure are rotatably coupled to each other.

As an improvement, the interpupillary distance adjusting device further includes a steel sheet. A first counter bore and a second counter bore are formed in the frame body corresponding to one end of the first pin bearing and one end of the second pin bearing. One side of the frame body away from the bracket body is recessed to form a mounting slot, the steel sheet is disposed in the mounting slot, the other end of the first pin bearing and the other end of the second pin bearing respectively penetrate through the first counter bore and the second counter bore, and one end of the second pin bearing close to the steel sheet abuts against the steel sheet.

As an improvement, the interpupillary distance adjusting device further includes a bearing, the bearing is fixed in the first counter bore, one end of the first pin bearing is fixed in the bearing, and the other end of the first pin bearing is fixed to an output end of the driving unit.

As an improvement, the frame body, the extension portion and the inner ring gear structure are integrally formed.

As an improvement, the frame is made of a plastic material.

Compared with the related art, in the interpupillary distance adjusting device of the present disclosure, an end of the first rack close to the first lens module is fixed to one side of the first lens module, and an end of the second rack close to the second lens module is fixed to one side of the second lens module. The first rack and the second rack are parallel to each other. The first gear member includes a first pin bearing fixedly connected to an output end of the driving unit and a first gear fixed to the first pin bearing. The second gear member includes a second pin bearing rotatably arranged in the frame and a second gear fixed to the second pin bearing. The first gear has a tooth number less than the second gear. An output end of the driving unit drives the rotation of the first pin bearing to drive the rotation of the first gear. The rotation of the first gear drives the rotation of the first rack and the second gear respectively, so that the second rack also rotates with the second gear to achieve relative movement between the first rack and the second rack, thereby achieving automatic adjustment of the inter-pupillary distance between the first lens module and second lens module with high adjustment accuracy, small volume occupation, high stability, and thus good user experience.

BRIEF DESCRIPTION OF DRAWINGS

In order to illustrate the technical solutions in embodiments of the present disclosure more clearly, the drawings required to be used in the description of the embodiments will be briefly described below. It is appreciated that, the drawings in the following description are only some embodiments of the present disclosure, and for those skilled in the art, other drawings can also be obtained according to these accompanying drawings without creative effort.

DESCRIPTION OF EMBODIMENTS

Technical solutions in embodiments of the present disclosure will be described clearly and completely below in connection with the drawings in the present disclosure, and it will be apparent that the embodiments described here are only a part of the embodiments of the present disclosure, not all of them. All other embodiments obtained by those skilled in the art based on the embodiments of the present disclosure without creative efforts should fall within the protection scope of the present disclosure.

Figure 1:
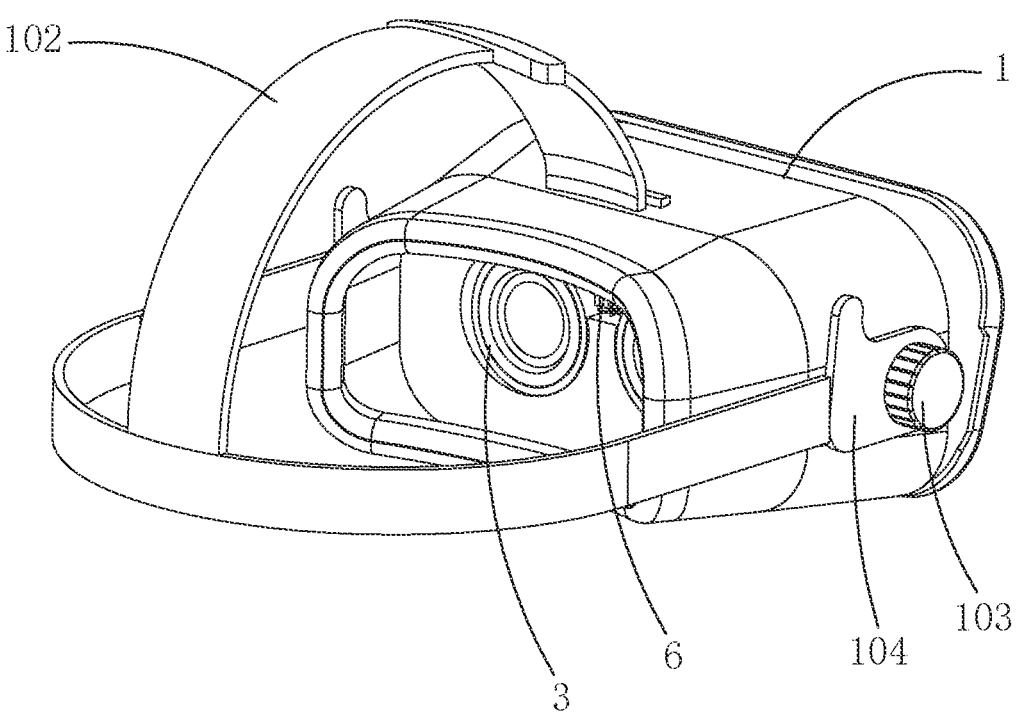
FIG. 1 is a structural schematic diagram of VR glasses according to the present disclosure.
Figure 2:
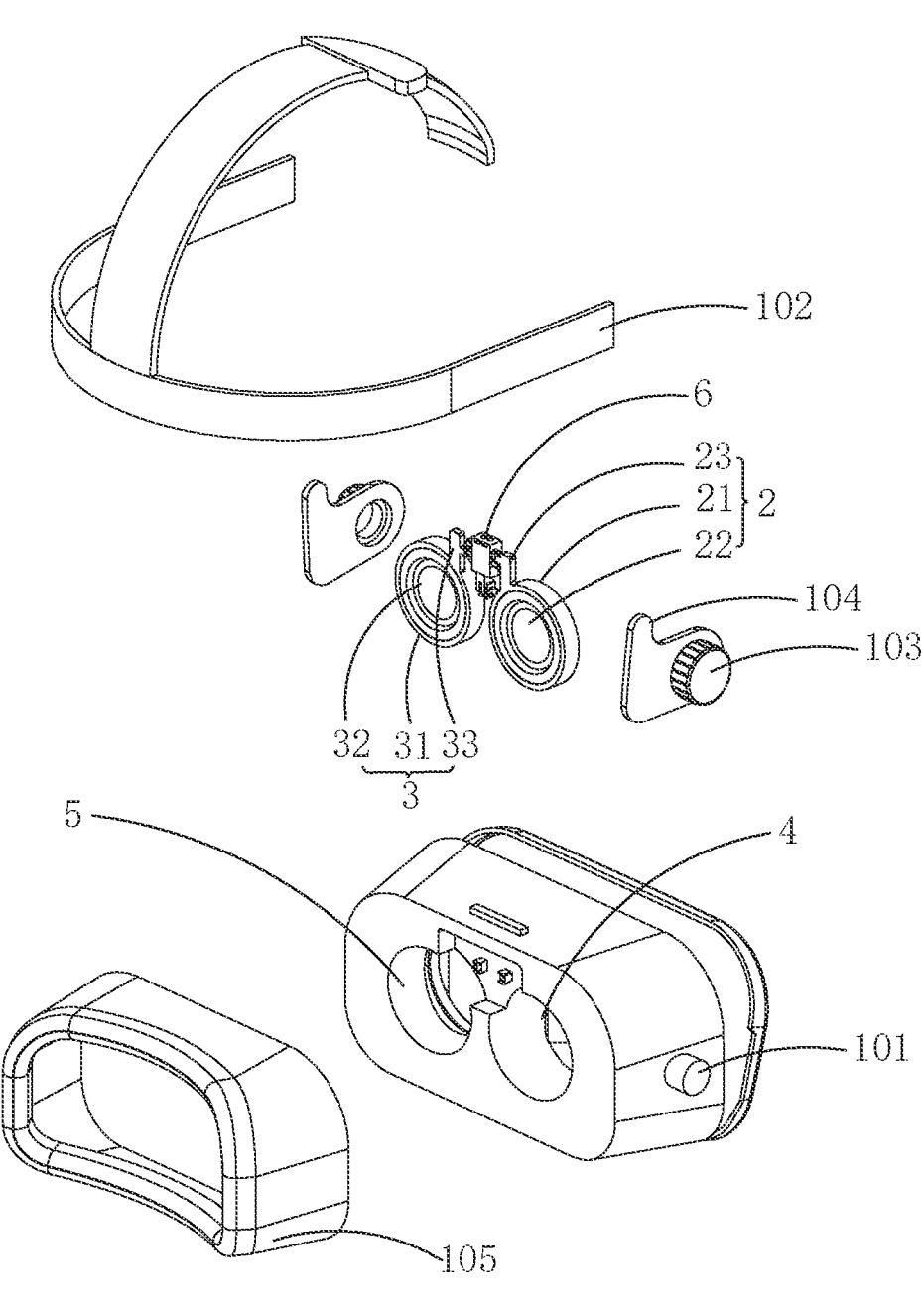
FIG. 2 is an exploded view of FIG. 1.
Figure 3:
FIG. 3 is a structural schematic diagram of an interpupillary distance adjusting device according to the present disclosure.
Figure 4:
FIG. 4 is an exploded view of FIG. 3.
Figure 4:
Figure 5:
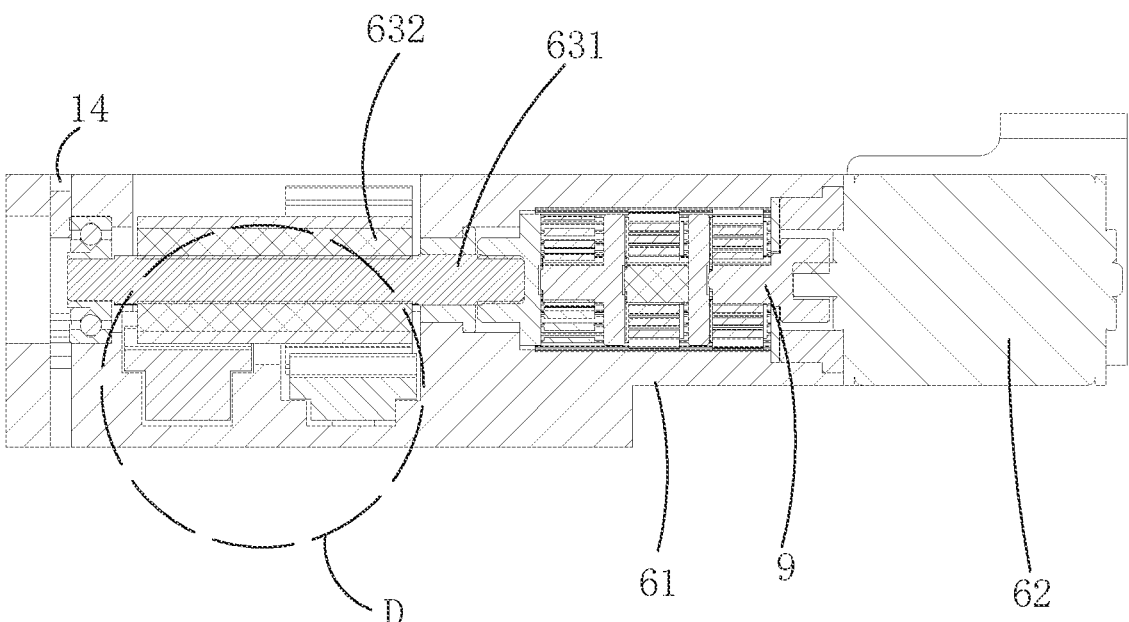
FIG. 5 is a sectional view taken along line A-A of FIG. 3.
Figure 6:
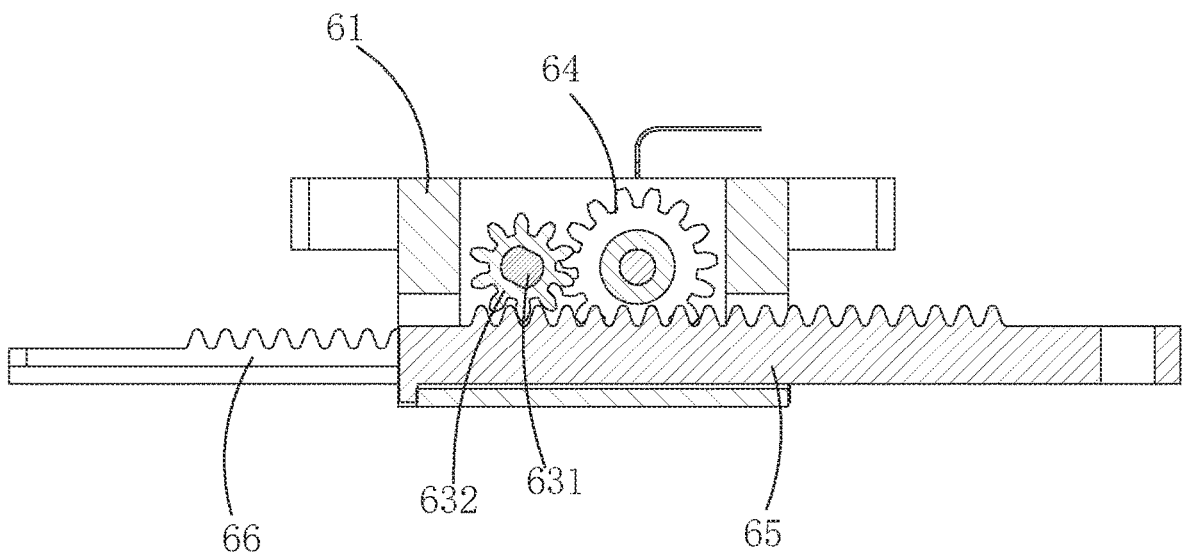
FIG. 6 is a sectional view taken along line B-B of FIG. 3.
Figure 7:
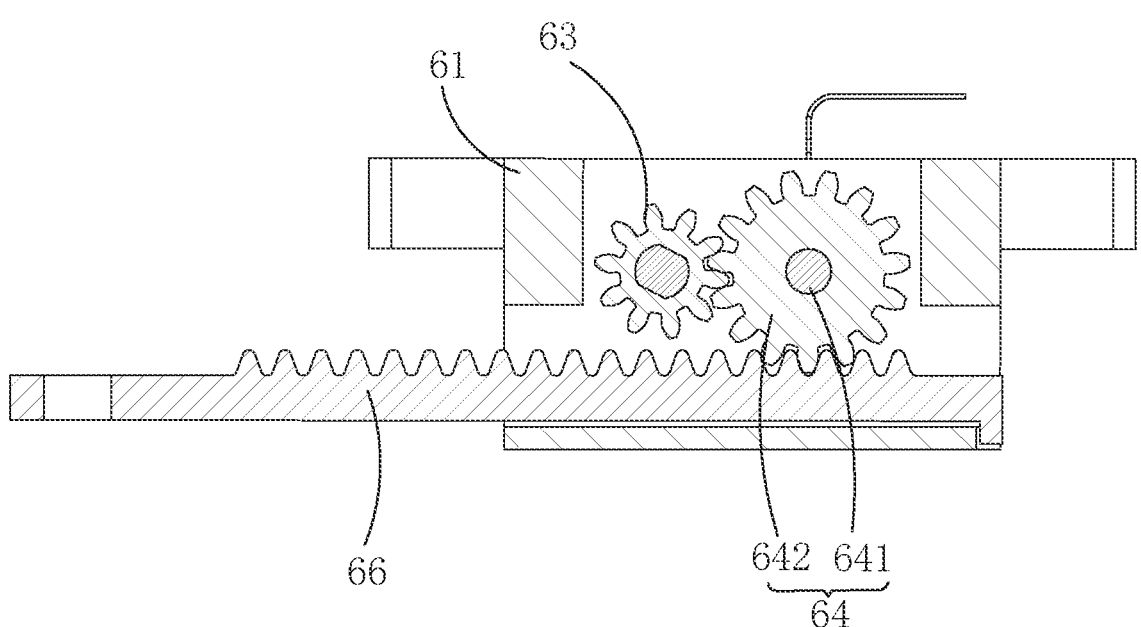
FIG. 7 is a sectional view taken along line C-C of FIG. 3.
Figure 8:
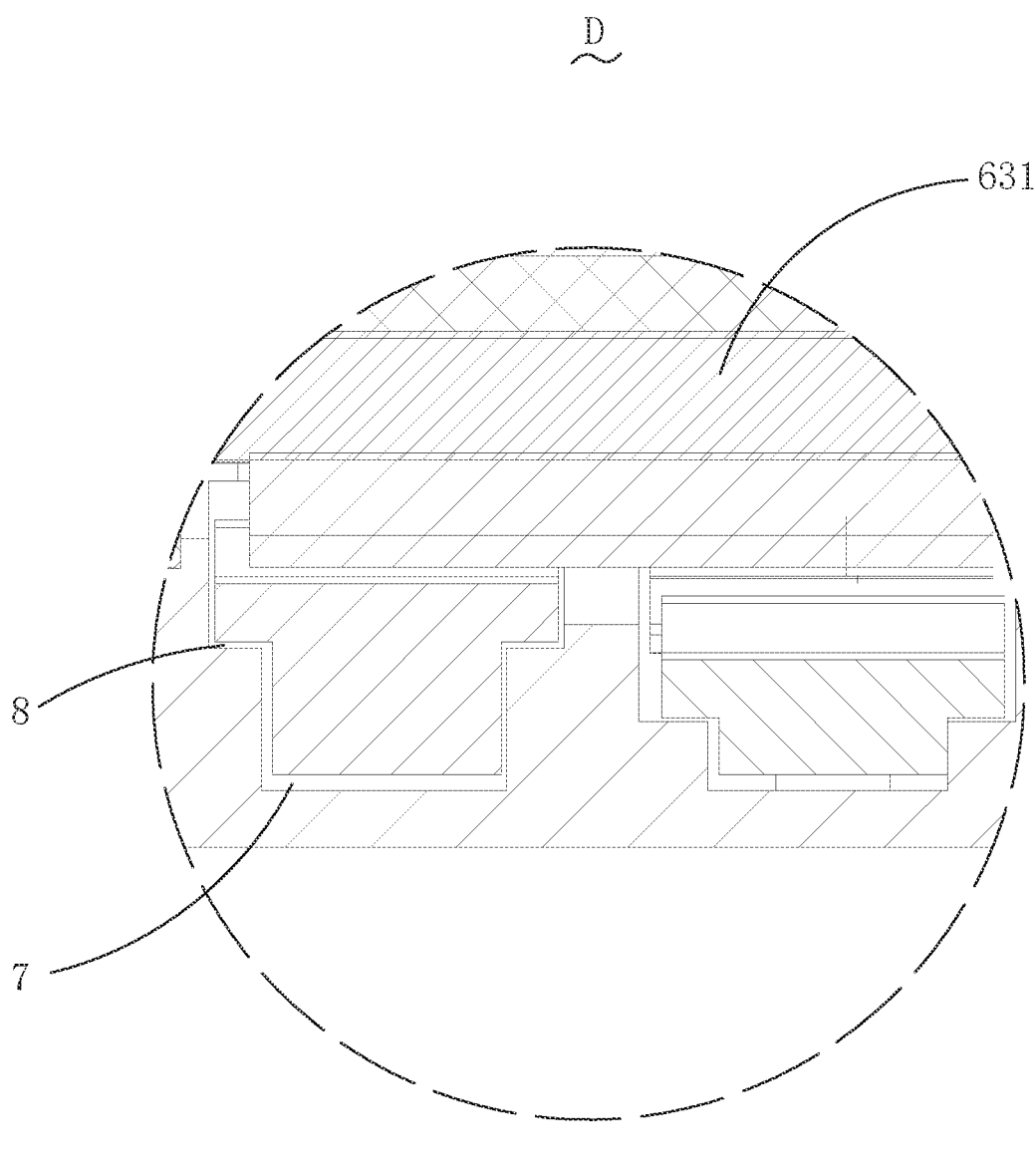
FIG. 8 is a partial enlarged view of part D in FIG. 5.
Figure 9:
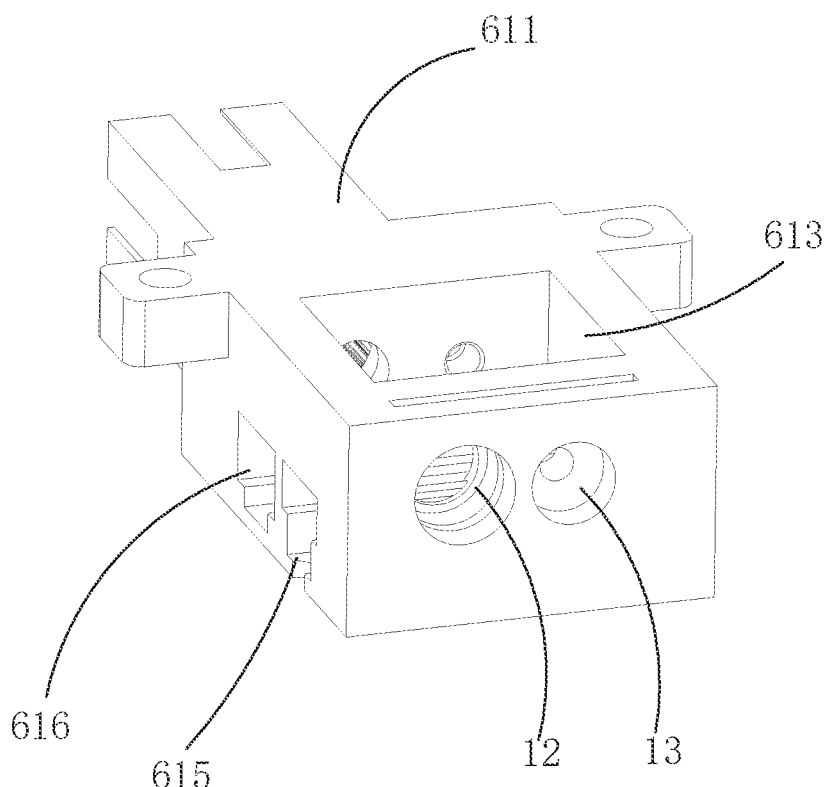
FIG. 9 is a structural schematic diagram of a frame of FIG. 3.
Figure 10:
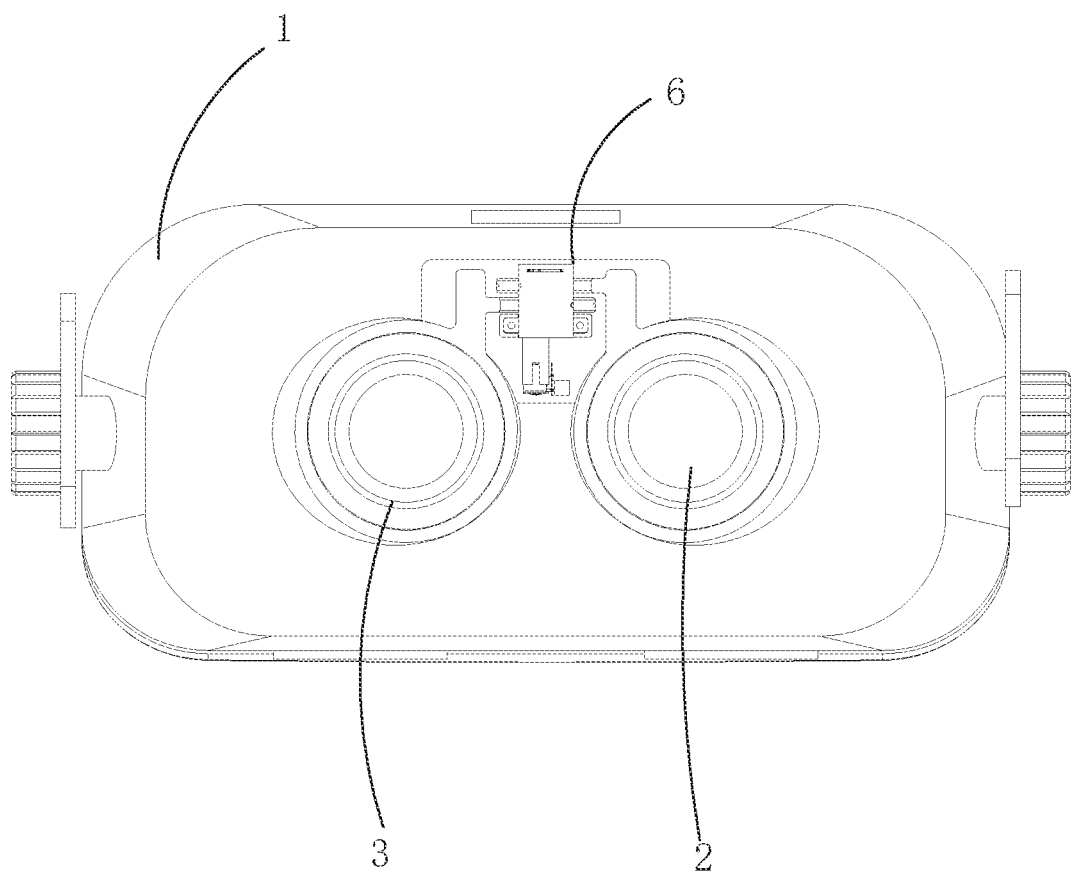
FIG. 10 is a schematic diagram showing a first state of an interpupillary distance adjusting device according to the present disclosure.
Figure 11:
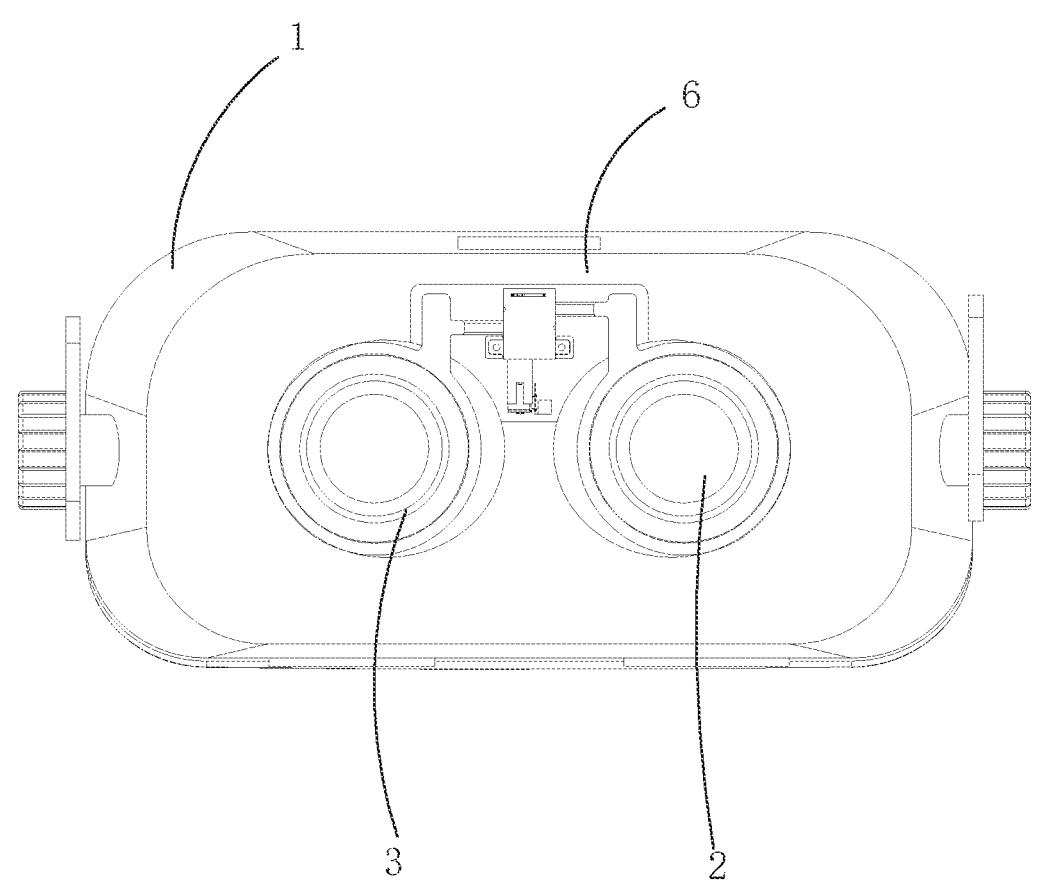
FIG. 11 is a schematic diagram showing a second state of the interpupillary distance adjusting device according to the present disclosure.

Referring to FIGS. 1-11, the present disclosure provides an interpupillary distance adjusting device 100, which is applied to VR glasses. The VR glasses include a bracket body 1, a first mounting hole 4 and a second mounting hole 5 that penetrate through the bracket body 1 and are spaced apart from each other, a first lens module 2 mounted in the first mounting hole 4, and a second lens module 3 mounted in the second mounting hole 5. A transverse aperture of the first mounting hole 4 is greater than a diameter of the first lens module 2, and a transverse aperture of the second mounting hole 5 is greater than a diameter of the second lens module 3. The interpupillary distance adjusting device 100 further includes a driving module 6 fixed to the bracket body 1 and located between the first lens module 2 and the second lens module 3. The driving module 6 is configured to drive the first lens module 2 and the second lens module 3 to move synchronously in a direction towards each other or in a direction away from each other, to realize interpupillary distance adjustment. It is convenient for the driving module 6 to drive the first lens module 2 and the second lens module 3 to move towards or away from each other, so as to achieve synchronous adjustment of the interpupillary distance between the left and right lenses.

The VR glasses further include an eye shield 105 fixed to the bracket body 1, fixing posts 101 fixed to two sides of the bracket body 1, a flap 104 sleeved on the fixing post 101, a head-mounted frame 102 sleeved on one side of the fixing post 101 away from the flap 104, and a locking member 103 for fixing the head-mounted frame 102 to the fixing post 101. The head-mounted frame 102 is placed on the user's head, with the left and right eyes corresponding to the first lens module 2 and the second lens module 3, respectively, and fixed with the locking element 103.

One side of the bracket body 1 away from the driving module 6 is provided with a glasses cover to achieve protection effect.

The driving module 6 includes a frame 61 fixed to one side of the bracket body 1, a driving unit 62 fixed to one side of the frame 61, a first gear member 63 rotatably disposed in the frame 61 and in transmission connection with the driving unit 62, a second gear member 64 rotatably disposed in the frame 61 and engaged with the first gear member 63, a first rack 65 engaged with the first gear member 63, and a second rack 66 engaged with the second gear member 64. An end of the first rack 65 close to the first lens module 2 is fixed to one side of the first lens module 2, and an end of the second rack 66 close to the second lens module 3 is fixed to one side of the second lens module 3. The first rack 65 and the second rack 66 are parallel to each other. Due to the parallel design of the racks, the volume of the driving structure is significantly reduced, thereby expanding the application scenario.

Optionally, the frame 61 is detachably fixed to the bracket body 1 to facilitate maintenance or replacement of the driving module 6. The frame 61 is fixedly connected to one side of the bracket body 1 by screws.

Optionally, the driving unit 62 is a stepping motor, a driving motor or the like, and the driving unit 62 of the present disclosure adopts the stepping motor, and the lens adjustment speed can be controlled by changing the pulse frequency by software, thereby improving the user experience. However, the driving motor is not limited to a stepping motor, and other motor forms such as a brush motor may also be used according to considerations such as driving and cost requirements.

In this embodiment, the interpupillary distance adjusting device 100 further includes a flexible circuit board 16, which is electrically connected to the stepping motor for inputting power supply to implement motor driving.

The first lens module 2 includes a first lens barrel 21, a first lens group 22 fixed in the first lens barrel 21, and a first connecting portion 23 protruding and extending from an outer wall of the first lens barrel 21. The second lens module 3 includes a second lens barrel 31, a second lens group 32 fixed in the second lens barrel 31, and a second connecting portion 33 protruding and extending from an outer wall of the second lens barrel 31. An end of the first rack 65 is clamped and fixed to the first connecting portion 23, and an end of the second rack 66 is clamped and fixed to the second connecting portion 33. The first rack 65 is arranged perpendicular to the first connecting portion 23, and the second rack 66 is arranged perpendicular to the second connecting portion 33.

The first gear member 63 includes a first pin bearing 631 fixedly connected to an output end of the driving unit 62 and a first gear 632 fixed to the first pin bearing 631. The second gear member 64 includes a second pin bearing 641 rotatably disposed in the frame 61 and a second gear 642 fixed to the second pin bearing 641. The tooth number of the first gear 632 is less than the second gear 642. The first rack 65 and the second rack 66 are driven by the same driving unit 62. With one end having exactly the same speed, ensuring synchronous adjustment of the left and right modules are adjusted synchronously opposite to each other or away from each other with the same speed, thereby achieving automatic adjustment of the distance between the first lens module 2 and the second lens module 3, with high adjustment accuracy, small volume occupation, light overall weight, high stability, and thus good user experience.

In this embodiment, the first rack 65 and the second rack 66 are arranged adjacent to each other in a staggered manner, and the first rack 65 and the second rack 66 move the same amount per unit time. Through the introduction of the second gear 642 and the staggered arrangement of the dual racks, the driving parts of the first rack 65 and the second rack 66 are driven synchronously at a constant speed in opposite directions.

The tooth number of the second gear 642 is set to be greater than the tooth number of the first gear 632, and through reasonable modulus and tooth number difference, the tooth tip circle of the first gear 632 does not contact the tooth tip of the second rack 66 and leaves a certain gap. The second rack 66 is engaged with the second gear 642 to realize transmission. When moving left and right, it does not interfere with the first gear 632, thus achieving volume miniaturization.

The design principle for the tooth number requirements of the first gear 632 and the second gear 642 is as follows: assuming that the gear and rack modulus are m, the tooth number of the first gear 632 is $Z_1$, and the tooth number of the second gear 642 is $Z_2$. When the first gear 632 rotates for one revolution, the movement amount of the first rack 65 is $S_1=m*Z_1$, and the number of rotations of the second gear 642 is $Z_1/Z_2$. The movement amount corresponding to the second rack 66 is $S_2=m*Z_2*Z_1/Z_2=m*Z_1$. Therefore, the movement amount of the two racks per unit time are equal, and the movement speeds are identical, thereby achieving the effect of synchronous adjustment of the interpupillary distance.

In this embodiment, the frame 61 includes a frame body 611 fixed to one side of the bracket body 1, an extension portion 612 formed by extending from one side of the frame body 611 close to the first lens module 2, a through hole 614 penetrating through the extension portion 612, a groove 613 formed by recessing from one side of the frame body 611 close to the bracket body 1 away from the bracket body 1, and a first limiting slot 615 and a second limiting slot 616 respectively penetrating through the frame body 611 and communicating with the groove 613. The driving unit 62 is fixed in the through hole 614. The first gear member 63 and the second gear member 64 are located in the groove 613, and the first rack 65 and the second rack 66 are respectively disposed in the first limiting slot 615 and the second limiting slot 616. The first limiting slot 615 and the second limiting slot 616 are respectively configured to limit the left and right movement of the first rack 65 and the second rack 66, to ensure stable driving of the lens. The frame body 611 has a closed structure, and the first limiting slot 615 and the second limiting slot 616 are provided in the frame body 611, which can effectively ensure the structural strength of the frame body 611 and improve the structural reliability during driving and mechanical impact.

In this embodiment, the first rack 65 includes a first rack body 651, a first support plate 652 extending from the first rack body 651 towards the bracket body 1, and a first tooth-shaped structure 653 extending from the first support plate 652 towards the bracket body 1. One side of the first rack body 651 away from the bracket body 1 is spaced apart from a slot wall of the first limiting slot 615 to form a first gap 7, and one side of the first support plate 652 away from the bracket body 1 is spaced apart from the slot wall of the first limiting slot 615 to form a second gap 8.

In this embodiment, the second rack 66 includes a second rack body 661, a second support plate 662 extending from the second rack body 661 toward the direction close to the bracket body 1, and a second tooth-shaped structure 663 extending from the second support plate 662 toward the direction close to the bracket body 1. One side of the second rack body 661 away from the bracket body 1 is spaced apart from a slot wall of the second limiting slot 615 to form a first gap 7, and one side of the second support plate 662 away from the bracket body 1 is spaced apart from a slot wall of the second limiting slot 615 to form a second gap 8.

In one embodiment, the second gap 8 is smaller than the first gap 7. By using the frame body 611 at the second gap 8 as a limiting position, the structural strength of the frame body 611 is further improved.

In this embodiment, the interpupillary distance adjusting device 100 further includes a multi-stage planetary gearbox 9. An input end of the multi-stage planetary gearbox 9 is fixedly connected to the driving unit 62, and an output end of the multi-stage planetary gearbox 9 is fixedly connected to the first gear member 63. According to driving loads and speed requirements, the multi-stage planetary gearbox 9 can be designed in different stages. An inner ring gear structure 10 is arranged in the through hole 614. The multi-stage planetary gearbox 9 is arranged in the through hole 614. The multi-stage planetary gearbox 9 and the inner ring gear structure 10 are rotatably coupled. An output end of the driving unit 62 drives the multi-stage planetary gearbox 9 to rotate in the inner ring gear structure 10, which has high control accuracy and good driving effect.

The multi-stage planetary gearbox 9 includes stages 2, 3, 4, etc., but is not limited to specific stages and transmission ratios, as long as it can achieve high control accuracy and improve user experience. Optionally, the multi-stage planetary gearbox 9 is a 3-stage planetary gearbox with a movement accuracy of +5 μm or lower, resulting in better performance.

By connecting the first pin bearing 631 of the first gear member 63 to an output end of the multi-stage planetary gearbox 9, the driving unit 62 drives the multi-stage planetary gearbox 9 to rotate the first pin bearing 631, thereby driving the first gear 632 to rotate. When the first gear 632 rotates clockwise, the second gear 642 engaged with the first gear 632 rotates counterclockwise, the first rack 65 moves to the left, the second rack 66 moves to the right, the first lens module 2 and the second lens module 3 move toward each other. When the first gear 632 rotates counterclockwise, the first lens module 2 and the second lens module 3 move away from each other, thereby achieving automatic interpupillary distance adjustment.

In this embodiment, the interpupillary distance adjusting device 100 further includes a steel sheet 11. A first counter bore 12 and a second counter bore 13 are formed at one end of the frame body 611 corresponding to the first pin bearing 631 and one end of the second pin bearing 641, respectively. One side of the frame body 611 away from the bracket body 1 is recessed away from the bracket body 1 to form a mounting slot 14, and the steel sheet 11 is disposed in the mounting slot 14. The other end of the first pin bearing 631 and the other end of the second pin bearing 641 respectively penetrate through the first counter bore 12 and the second counter bore 13, and one end of the second pin bearing 641 close to the steel sheet 11 abuts against the steel sheet 11.

In this embodiment, the interpupillary distance adjusting device 100 further includes a bearing 15, which is fixed in the first counter bore 12. One end of the first pin bearing 631 is fixed to an inner ring of the bearing 15 by welding, and the other end of the first pin bearing 631 is supported by a bearing at the same time, with its head extending into the inner side of an output end of the planetary gearbox and combined in a flat structure. The steel sheet 11 is fixed to the frame body 611 through the mounting slot 14, so that the side surface of the steel sheet 11 limits the second pin bearing 641 and the bearing for fixing the first pin bearing 631, preventing the first pin bearing 631 from loosening or falling off in a mechanical impact environment such as falling, so the safety is good.

In this embodiment, the first pin bearing 631 is matched with the first gear 632 in a flat structure to ensure that an output drives the first gear 632 to rotate. The second pin bearing 641 is also fixed and limited by the steel sheet 11, and the upper portion of the steel sheet 11 and the frame body 611 are fixed by dispensing glue, so that the impact force borne by the steel sheet 11 is axial, thereby ensuring high reliability.

One end of the first pin bearing 631 is fixed in the bearing 15 by welding. The other end of the first pin bearing 631 is fixed to an output end of the driving unit 62. A tail end of the first pin bearing 631 is fixed by a ball bearing, and secured with a specially designed steel sheet 11. The second pin 641 can be assembled with the frame body 611 in an interference-fit manner, and sealed with a steel sheet 11. During the operating process, the second pin bearing 641 does not follow and rotate with the second gear 642, which completely eliminates the need for bearings 15 to fix both ends of the pin bearing. The friction force between the pin bearing and the bearing 15 is reduced. The bearing 15 and the frame body 611 are assembled, so as to reduce the number of parts used and the assembly cost, which prevents the great tolerance due to large number of parts used, thereby achieving high precision and efficiency.

In this embodiment, the frame body 611, the extension portion 612 and the inner ring gear structure 10 are integrally formed, which effectively simplifies the structural volume, and reduces assembly difficulty and costs.

In this embodiment, the frame 61 is made of a plastic material, which can reduce the weight of the mechanism and reduce the operating noise of the module. In addition, it also reduces the pressure of head-mounted VR glasses and enhances the experience.

It should be understood that, when the first gear/rack and the second gear/rack shown in the embodiments of the present disclosure are interchanged, that is, when the driving unit is connected to the current second gear, the technical effect of the present disclosure can also be achieved, which belongs to the protection scope of the present disclosure.

Compared with the related art, in the interpupillary distance adjusting device of the present disclosure, an end of the first rack close to the first lens module is fixed to one side of the first lens module, and an end of the second rack close to the second lens module is fixed to one side of the second lens module. The first rack and the second rack are parallel to each other. The first gear member includes a first pin bearing fixedly connected to an output end of the driving unit and a first gear fixed to the first pin bearing. The second gear member includes a second pin bearing rotatably arranged in the frame and a second gear fixed to the second pin bearing. The tooth number of the first gear is less than the second gear. The driving unit drives the rotation of the first pin bearing to drive the rotation of the first gear. The rotation of the first gear drives the rotation of the first rack and the second gear respectively, so that the second rack also rotates with the second gear to achieve synchronous or separate movement between the first rack and the second rack, thereby achieving automatic adjustment of the interpupillary distance between the first lens module and second lens module with high adjustment accuracy, small volume occupation, high stability, and thus good user experience.

The above are only embodiments of the present disclosure, and it should be noted that those skilled in the art can further make modifications or improvements without departing from the concept of the present disclosure, but these modifications or improvements all fall within the protection scope of the present disclosure.

What is claimed is:

1. An interpupillary distance adjusting device, applied to VR glasses, wherein the VR glasses comprise a bracket body, a first mounting hole and a second mounting hole that penetrate through the bracket body and spaced apart from each other, a first lens module mounted in the first mounting hole, and a second lens module mounted in the second mounting hole, wherein a transverse aperture of the first mounting hole is greater than a diameter of the first lens module, and a transverse aperture of the second mounting hole is greater than a diameter of the second lens module; the interpupillary distance adjusting device comprises a driving module fixed to the bracket body and located between the first lens module and the second lens module, and the driving module is configured to drive the first lens module and the second lens module to move synchronously in a direction towards each other or in a direction away from each other to realize interpupillary distance adjustment; the driving module comprises a frame fixed to the bracket body, a driving unit fixed to one side of the frame, a first gear member rotatably disposed in the frame and in transmission connection with the driving unit, a second gear member rotatably disposed in the frame and engaged with the first gear member, a first rack engaged with the first gear member, and a second rack engaged with the second gear member, wherein an end of the first rack close to the first lens module is fixed to one side of the first lens module, and an end of the second rack close to the second lens module is fixed to one side of the second lens module; and the first rack and the second rack are parallel to each other; and the first gear member comprises a first pin bearing fixedly connected to an output end of the driving unit and the first gear fixed to the first pin bearing; the second gear member comprises a second pin bearing rotatably arranged in the frame and the second gear fixed to the second pin bearing, wherein the first gear has a tooth number less than the second gear.

2. The interpupillary distance adjusting device as described in claim 1, wherein the first rack and the second rack are arranged in a staggered manner, and the first rack and the second rack move the same amount per unit time.

3. The interpupillary distance adjusting device as described in claim 1, wherein the frame comprises a frame body fixed to one side of the bracket body, an extension portion formed by extending from one side of the frame body close to the first lens module, a through hole penetrating through the extension portion, a groove formed by recessing from one side of the frame body close to the bracket body in a direction away from the bracket body, and a first limiting slot and a second limiting slot respectively penetrating through the frame body and communicating with the groove; and the driving unit is fixed in the through hole, the first gear member and the second gear member are located in the groove, the first rack is disposed in the first limiting slot and the second rack is disposed in the second limiting slot.

4. The interpupillary distance adjusting device as described in claim 3, wherein the first rack comprises a first rack body, a first support plate extending from the first rack body in a direction close to the bracket body, and a first tooth-shaped structure extending from the first support plate in a direction close to the bracket body; one side of the first rack body away from the bracket body is spaced apart from a slot wall of the first limiting slot to form a first gap, and one side of the first support plate away from the bracket body is spaced apart from a slot wall of the first limiting slot to form a second gap.

5. The interpupillary distance adjusting device as described in claim 4, wherein the second gap is smaller than the first gap.

6. The interpupillary distance adjusting device as described in claim 3, further comprising a multi-stage planetary gearbox, wherein an input end of the multi-stage planetary gearbox is fixedly connected to the driving unit, and an output end of the multi-stage planetary gearbox is fixedly connected to the first gear member; and an inner ring gear structure is arranged in the through hole, the multi-stage planetary gearbox is arranged in the through hole, and the multi-stage planetary gearbox and the inner ring gear structure are rotatably coupled to each other.

7. The interpupillary distance adjusting device as described in claim 3, further comprising a steel sheet, wherein a first counter bore and a second counter bore are formed in the frame body corresponding to one end of the first pin bearing and one end of the second pin bearing, one side of the frame body away from the bracket body is recessed to form a mounting slot, the steel sheet is disposed in the mounting slot, the other end of the first pin bearing and the other end of the second pin bearing respectively penetrate through the first counter bore and the second counter bore, and one end of the second pin bearing close to the steel sheet abuts against the steel sheet.

8. The interpupillary distance adjusting device as described in claim 7, further comprising a bearing, wherein the bearing is fixed in the first counter bore, one end of the first pin bearing is fixed in the bearing, and the other end of the first pin bearing is fixed to an output end of the driving unit.

9. The interpupillary distance adjusting device as described in claim 6, wherein the frame body, the extension portion and the inner ring gear structure are integrally formed.

10. The interpupillary distance adjusting device as described in claim 1, wherein the frame is made of a plastic material.

* * * * *